No. 855,942. PATENTED JUNE 4, 1907.
F. DURET.
PROCESS OF DISINFECTION.
APPLICATION FILED MAY 21, 1906.
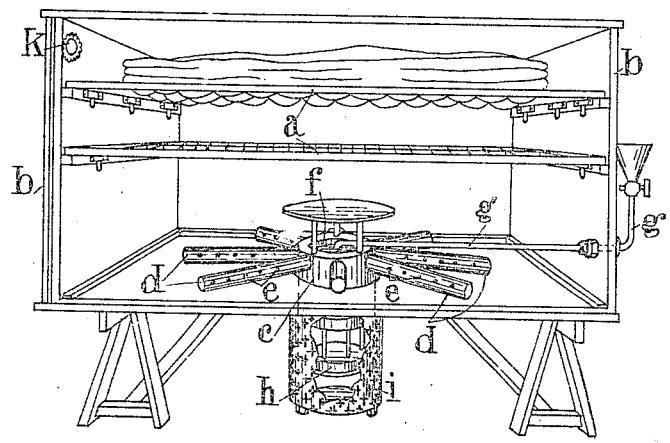
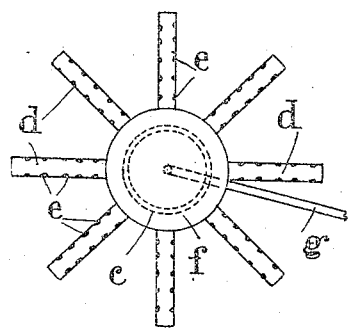

UNITED STATES PATENT OFFICE.

FRANCOIS DURET, OF PARIS, FRANCE.

PROCESS OF DISINFECTION.

No. 855,942.  Specification of Letters Patent.  Patented June 4, 1907.

Application filed May 21, 1906. Serial No. 317,859.

*To all whom it may concern:*

Be it known that I, FRANCOIS DURET, a citizen of the French Republic, and a resident of Paris, France, have invented certain new and useful Improvements in Processes of Disinfection, of which the following is a specification.

My new and improved process of disinfection is based essentially on the combination of the successive action on the goods to be disinfected of dry heat, then of steam with a slight addition of a special antiseptic and thereafter of the vapor of said antiseptic alone, in a closed heating chamber, under certain conditions of temperature and during a period varying according to the size of the disinfecting chamber.

The disinfecting liquid employed by me, in carrying out my improved process of disinfection, is composed of a mixture of two (2) parts of formic aldehyde, one (1) part of ethylic aldehyde and a very slight addition of eosine; the mixture so formed is known in the trade by the name of "aldeol."

In the accompanying drawing, forming a part of this specification, I have shown a form of apparatus for carrying out my improved process of disinfection. Figure 1, showing a front view in elevation with the front wall or door removed of such apparatus, and Fig. 2 showing a top plan view of the stove or device by which the disinfecting chamber is heated and the disinfecting fluid vaporized and fed to the same.

The disinfecting box or chamber $b$ is usually of such size as to be readily supported upon suitable horses, as shown in Fig. 1, is rectangular in shape and provided with grating shelves $a$ to support the articles to be disinfected, and in order to retain the heat, the walls on all sides are suitably insulated. A double wall of sheet steel with a closed air space of a few centimeters answers the purpose or said space may be filled with any suitable insulating material.

The flooring of the chamber $b$ is preferably provided with a central circular hole for the passage and support of the heating apparatus, and disinfector vaporizer, which consists of a cylinder $c$ from the periphery of which pipes $d$ perforated with holes $e$ radiate, the whole placed over a suitable heating device, for instance a lamp $h$ having multiple jets and surrounded by a perforated drum $i$. A vent $k$ which may be closed at will is provided at a suitable point in the upper part of the chamber $b$.

The upper end of the cylinder $c$ forms a dish $f$ into which the liquid to be vaporized may be conveyed through a pipe $g$.

The form, dimensions and mode of construction of the chamber and heater may be varied at will, the essential point being that during the desired time such chamber can be hermetically closed and that the walls allow the temperature, required for successfully carrying out the disinfection process, to be maintained for a considerable period.

To carry out my improved process of disinfection, the articles to be disinfected are placed on the shelves, the chamber $b$ is closed leaving open the vent $k$ and the chamber is heated until the thermometer indicates 80° C., whereupon the vent $k$ is closed. A mixture of water and 5% of the disinfecting fluid before described is then conveyed through pipe $g$ into the dish or receptacle $f$, and at the end of sufficient time to thoroughly vaporize the mixture of water and disinfecting fluid, usually about 10 minutes, a quantity of such disinfecting fluid in its full strength, sufficient when vaporized thoroughly to fill the chamber with its vapors is introduced through pipe $g$. The stove or heater is then kept in action for about two hours, during which the temperature must be maintained above 80° C., (say between 80° and 95°C.) After the expiration of this time the disinfection is absolute and the articles treated undergo no deterioration.

Having now described my invention, what I claim is:

1. The hereinbefore described process of disinfection which consists in subjecting the articles to be disinfected in a chamber first to the action of dry heat, second to the action of vapors of a mixture of water, formic aldehyde and ethylic aldehyde with a very slight addition of eosine and third to action of vapors of pure formic aldehyde, ethylic aldehyde and a slight addition of eosine substantially as described.

2. The hereinbefore described process of disinfection, which consists in subjecting the articles to be disinfected in a chamber first to the action of dry heat, second of the vapors of a mixture of water and 5% of a disinfecting fluid composed of formic aldehyde, ethylic aldehyde and a very slight addition of eosine and third to the vapors of pure formic aldehyde, ethylic aldehyde and a slight addition of eosine substantially as described.

In testimony whereof I affix my signature in presence of two witnesses.

FRANCOIS DURET.

Witnesses:
VICTOR NATRAU,
AUGUSTUS E. INGRAM.